(12) United States Patent
Burrows (10) Patent No.: US 6,547,626 B1
(45) Date of Patent: Apr. 15, 2003

(54) MAGNETICALLY INTERACTIVE SUBSTRATE FOR A BOOK

(75) Inventor: Roger I. Burrows, Southport, CT (US)

(73) Assignee: Sandvik Innovations LLC, Bristol, PA (US)

( * ) Notice: Subject to any disclaimer, the term of this patent is extended or adjusted under 35 U.S.C. 154(b) by 0 days.

(21) Appl. No.: 09/714,428

(22) Filed: Nov. 16, 2000

Related U.S. Application Data (63) Continuation of application No. 09/261,103, filed on Mar. 3, 1999.

(51) Int. Cl.$^7$ .......................... A63H 33/26; G09B 19/22
(52) U.S. Cl. .................. 446/135; 434/128; 434/136
(58) Field of Search ................. 434/168, 178, 434/190, 429, 330, 428, 430, 128, 333; 273/239, 283, 285, 153 R, 135; 446/135, 136; 283/82

(56) References Cited

U.S. PATENT DOCUMENTS

| | | |
|---|---|---|
| 1,531,070 A | 3/1925 | Bruns |
| 2,864,275 A | 12/1958 | Fraleigh ................ 88/471 |
| 3,093,919 A | 6/1963 | Holtz .................. 40/142 |
| 3,096,206 A | 7/1963 | Wade, Jr. .............. 117/121 |
| 3,308,462 A | 3/1967 | Gluck .................. 343/18 |
| 3,406,974 A | 10/1968 | Nelson ................. 273/134 |
| 3,464,134 A | 9/1969 | Franklin ............... 40/142 |
| 3,496,653 A | 2/1970 | Wolfner et al. .......... 35/73 |
| 3,662,477 A | 5/1972 | Weinstein .............. 434/330 |
| 3,716,935 A | 2/1973 | Friederichs ............ 40/142 |
| 3,726,026 A | 4/1973 | Borcherding ............ 35/62 |
| 3,758,693 A | 9/1973 | Ebert .................. 434/261 |
| 3,769,720 A | 11/1973 | Terrones ............... 35/7 |
| 3,927,930 A | 12/1975 | Goldberg et al. ........ 350/151 |
| 3,928,921 A | 12/1975 | Gurman ................. 35/7 |
| 3,994,079 A | 11/1976 | Mirman ................. 35/53 |
| 4,025,379 A | 5/1977 | Whetstone ............ 156/306 |
| 4,032,674 A | 6/1977 | Hirabayashi et al. ..... 427/130 |
| 4,306,869 A | 12/1981 | Oettinger et al. ....... 434/305 |
| 4,584,223 A | 4/1986 | Krapf .................. 428/58 |
| 4,604,065 A | 8/1986 | Frazer ................. 434/331 |
| 4,676,753 A * | 6/1987 | Haggas ................. 434/155 |
| 4,702,700 A * | 10/1987 | Taylor ................. 434/168 |
| 4,832,605 A | 5/1989 | Bragin ................. 434/168 |
| 4,876,140 A | 10/1989 | Quackenbush ............ 428/216 |
| 4,908,164 A | 3/1990 | Brussino ............... 264/22 |
| 4,952,153 A | 8/1990 | McAllister ............. 434/259 |
| 4,960,651 A | 10/1990 | Pettigrew et al. ....... 428/607 |
| 4,990,117 A | 2/1991 | Yonezawa ............... 446/136 |
| 5,005,841 A | 4/1991 | Klick .................. 273/345 |
| 5,006,000 A | 4/1991 | House .................. 434/161 |
| 5,041,331 A | 8/1991 | Glavin et al. .......... 428/220 |
| 5,079,058 A | 1/1992 | Tomiyama et al. ........ 428/40 |
| 5,178,573 A | 1/1993 | Smith .................. 446/73 |
| 5,203,847 A | 4/1993 | Butt ................... 273/157 |
| 5,419,706 A * | 5/1995 | Levy ................... 434/409 |
| 5,447,439 A | 9/1995 | Nathanson .............. 434/346 |
| 5,452,508 A | 9/1995 | Wu ..................... 29/428 |
| 5,609,788 A | 3/1997 | Deetz .................. 252/62.54 |
| 5,666,712 A | 9/1997 | Cvetkov ................ 29/458 |
| 5,820,383 A | 10/1998 | Levins ................. 434/238 |
| 5,868,599 A * | 2/1999 | Kaufman ................ 446/148 |
| 5,949,050 A * | 9/1999 | Fosbenner .............. 235/449 |

* cited by examiner

*Primary Examiner*—Derris H. Banks
*Assistant Examiner*—Kurt Fernstrom
(74) *Attorney, Agent, or Firm*—Drinker Biddle & Reath LLP (57) ABSTRACT

A magnetically interactive substrate is provided for a book. The book includes a plurality of interactive substrates in the form of a sheet or a panel of material. Each of the interactive substrates includes magnetizable areas or portions printed thereon. The magnetizable areas are printed using a magnetic ink formulated by magnetizable particles added to an ink formulated for a preselected printing process. The magnetizable particles are shaped and sized to be compatible with the preselected printing process. A plurality of removable play pieces are adapted to be attracted to the magnetizable areas on the substrate. Each of the removable play pieces includes a substrate or support member on which magnetic material is applied. The magnetic material allows the play piece to be selectively positioned on the magnetizable areas. In the preferred embodiment, the magnetizable areas are magnetized to have a specific direction of polarization so that the removable play pieces can be positioned on the magnetizable areas in only one manner.

6 Claims, 12 Drawing Sheets

MAGNETICALLY INTERACTIVE SUBSTRATE FOR A BOOK

This is a continuation Ser. No. 09/261,103 filed on Mar. 3, 1999

FIELD OF THE INVENTION

The present invention relates generally to the field of interactive substrates. In particular, the present invention relates to an interactive substrate for a book having magnetizable areas printed thereon.

BACKGROUND OF THE INVENTION

It is generally known that material having magnetic properties may be incorporated into a variety of applications. For instance, manufacturers have incorporated magnetic material into educational, instructional and interactive devices for children. Magnets and devices having magnetic properties have a special appeal to children due to the invisible properties of magnetism. There are numerous types of interactive toys, games, appliances and displays in which material having magnetic properties is advantageously used to encourage children to learn and practice basic skills such as reading and arithmetic.

One method of incorporating the invisible properties of magnetism into a product involves the method of adding ferromagnetic material such as iron particles into conventional paints or coatings. The iron particles are blended or mixed into the paint to form magnetic paint. The magnetic paint is then conventionally applied to the surface of a substrate, such as wall board, wood, sheet rock, plywood and the like to make signs and other types of displays having a magnet attracting surface. After the magnetic paint dries, the substrate is then cut into abstract shapes and sizes using conventional tooling.

One of the disadvantages of using the magnetic paint described above is the inability to create detailed images and designs out of the paint. That is, the magnetic paint is generally not adapted to be painted in specific locations or to form very meticulous or complex designs. Rather, the magnetic paint is designed to be applied in large areas simply to create a metallic or magnetic surface. Furthermore, the magnetic surface that is created is generally magnetized over the entire surface, rather than magnetized in specific locations. As a result, many educational and instructional displays used for children that utilize magnetic paint are limited to very basic designs and applications.

It is generally known that detailed designs and graphic images may be achieved through the use of a variety of conventional printing processes or techniques. Conventional printing techniques such as silk-screening, lithography, rotogravure, flexography, and the like are used to produce very meticulous designs and images on a substrate. However, most metallic or magnetic paints are not usable with the foregoing printing techniques. As a result, most interactive substrates, particularly those used for educational or instructional products marketed for children, lack any type of detailed designs and graphic images having magnetic properties.

Accordingly, it is desired to provide an interactive substrate having detailed designs and graphic images that incorporate the invisible properties of magnetism. It is also desired to provide a magnetically interactive substrate for books and other educational or instructional products marketed for children, that utilize detailed designs and graphic images having magnetic properties.

SUMMARY OF THE INVENTION

The present invention relates to a magnetically interactive substrate or layer of supporting material. The interactive substrate includes a magnetizable area applied thereon. The substrate includes an image surface and at least one edge. The magnetizable area is applied to the substrate using a magnetic ink having magnetizable particles and a preselected printing process. The magnetizable particles are shaped and sized to be compatible with the preselected printing process. A removable play piece is provided having magnetic material for interacting with the magnetizable area by magnetic attraction.

In the preferred embodiment, the interactive substrate is adapted in the form of a book. The removable play piece is shaped and sized to correspond to the magnetizable area. The magnetizable area can be permanently magnetized to have a predetermined direction of polarization. The removable play piece can also be magnetized, and the relative polarizations of the magnetizable area and the play piece can be opposite to each other so that the play piece can be positioned on the substrate in only one manner.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

THE DETAILED DESCRIPTION OF THE INVENTION

Figure 1:
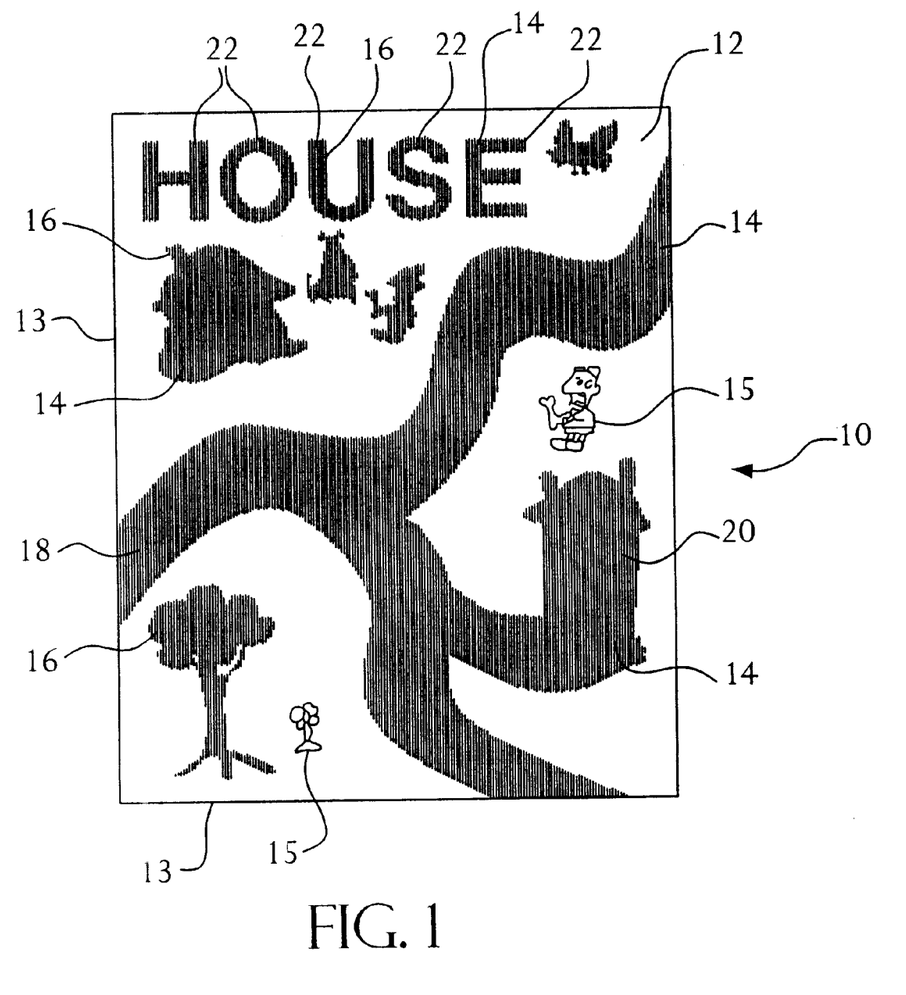
FIG. 1 is a top plan view of a preferred embodiment of magnetizable areas printed on a substrate, as contemplated by the present invention, adapted for a book.

Referring to the drawings, where like numerals indicate like elements, there are shown various embodiments of a magnetically interactive substrate as contemplated by the present invention. As shown in FIG. 1, the substrate is in the form of a sheet or a layer of supporting material designated the numeral 10. The substrate 10 may be made from paper or paper-like substances, fabric, card stock, ceramic material, plastic, wood, film, metal or the like. Although only one substrate 10 is shown in FIG. 1, it should be understood that multiple substrates may be used with the present invention in any form. The substrate 10 may be used as part of a poster, a calendar, a gift card, or as wall paper, packaging, gift boxes, displays, signage or the like, as a few examples. In the preferred embodiment, multiple substrates are bound together along a common edge to form a volume for a book.

The substrate 10 includes a first or front image surface 12, a second surface (not shown) and a circumferential edge 13. At least one magnetizable portion or area 14 is applied to the first surface 12 of the substrate 10. However, in the preferred embodiment shown in FIG. 1, a plurality of magnetizable areas or portions 14 are applied. The magnetizable areas 14 include graphic images and detailed designs having well defined borders or edges 16, such as the road 18, the house 20, and the letters "H" "O" "U" "S" and "E" 22 depicted in FIG. 1.

The magnetizable areas 14 may be applied anywhere on the substrate 10 so desired. The magnetizable areas 14 may be applied to the first surface 12 as shown in FIG. 1 or to both the first surface 12 and the second surface. As illustrated in FIG. 1, the magnetizable areas 14 may be positioned inwardly of the edge 13 of the substrate 10 or applied to cover the entire first surface 12.

The magnetizable areas 14 are made from a magnetic ink contemplated by the present invention. The magnetic ink generally includes a non-water based carrier, such as ink, typically formulated for a preselected printing process. Typically, inks formulated for printing are available in a variety of colors and have various material properties, viscosities, and other rheological characteristics. The ink may have a consistency or viscosity ranging from warm molasses to that of heavy paste. The viscosity of the ink will depend upon the type of printing process used. Accordingly, the type of ink that may be chosen to formulate the magnetic ink discussed herein will depend, in part, upon the particular printing process or means used for applying the ink to a substrate.

The art of printing includes two types of conventional printing process or techniques, namely off-contact printing and contact printing. Off-contact printing, such as silk screening, contemplates the use of a screen mesh having a particular image. The screen mesh includes a plurality of holes or orifices through which ink is forced or squeezed through under pressure and deposited onto the substrate. The clarity and type of details that can be formed on the substrate will depend upon the type of screen mesh used (such as fabric, nylon or metal), the size of the orifices, and the tension of the screen. Another form of off-contact printing is spraying in which ink is forced under pressure through an orifice to form an image on the substrate. On the other hand, contact printing such as off-set printing, lithography, flexography, rotogravure, stamping, impression printing and the like, contemplate the use of ink applied to a plate, a rotating drum or cylinder to transfer an image onto the substrate. In both off-contact and contact printing, the clarity of the image formed on the substrate may depend upon the viscosity and material properties of the ink that is used and the technique used to transfer the image. It is contemplated that the present invention may be used with any type of means for applying an magnetizable area or other indicia on a substrate.

The magnetizable ink also includes magnetizable particles, such as ferrite, iron, iron alloys or other material having strong ferromagnetic properties. The magnetizable particles should be sized and shaped to be compatible with the type of ink and/or the particular printing process ultimately selected. Accordingly, the size and shape of the magnetizable particles may be selected to be compatible with a particular type of ink, the viscosity of the ink, and the type of printing process or other means used for applying the ink to the substrate. As one example of this type of selection, if silk screening is preselected, ferromagnetic particles may be chosen provided that they are small enough to fit through the orifices of the screen mesh during printing.

Magnetizable particles in the range of about $60\mu$ or smaller have been useful in silk screening. By comparison, magnetizable particles in the range of about $30\mu$ or smaller have been useful in offset printing. Larger magnetizable particles have proven useful when the magnetic ink is applied to either the underside of a substrate or when a relatively thick substrate is used. Nonetheless, the present invention is not limited to any particular size of the magnetizable particles which is a matter of design choice.

To form the magnetic ink, the magnetizable particles are added to the preselected ink. The magnetizable particles may be added using mixing, blending, or any other means for dispersing the magnetizable particles within the ink. The magnetizable particles may be magnetized or non-magnetized either before or after being added to the ink. After the magnetic ink is formulated, it may then be applied to either the first surface 12 or second surface of the substrate 10 to the form of the magnetizable areas 14.

In practice, the magnetic properties of the magnetizable areas 14 may depend upon the magnetic ink and the printing process selected. For example, if relatively fine or smaller pre-magnetized particles are used, the magnetism of the magnetizable areas 14 may be low. Thus, to increase the magnetism, the magnetizable areas 14 may have to be formed using two or more passes with the preselected printing process. In the alternative, larger magnetizable particles may be used. Of course, the magnetizable areas 14 do not have to be magnetized at all.

After the magnetizable areas 14 are printed on the substrate 10, they may be over printed. Overprinting can be advantageously used to conceal or visually disguise the presence of the magnetizable areas 14 printed on the substrate. For instance, the magnetizable areas 14 can be overprinted with a white coating of material to visually conceal their presence on the substrate 10. Thereafter, the substrate 10 having the white coating material may be overprinted with other graphic images and pictorial designs such as a full color printed scene or characters, using a four color process or other techniques. Naturally, the white coating may be eliminated or replaced with a coating that is similar to the color of the substrate 10.

Returning to FIG. 1, the magnetizable areas 14 are overprinted with graphic indicia 15. The graphic indicia 15 can include any type of illustration, pictorial design, texture, colors and the like. In the preferred embodiment, the graphic indicia 15 will visually disguise the presence of the magnetizable areas 14. For example, grey ink may be printed on the road 18 shown on the substrate 10 to conceal the presence of the magnetizable material 14. Likewise, the house 20 can be overprinted with graphic indicia 15 to conceal the magnetizable area 14 of the house on the substrate 10. Any type of graphic indicia 15 may be used in keeping with the scope of the present invention. Preferably, the graphic indicia 15 are thematically related to the magnetizable area 14 on which it was applied or the story of the book.

Figure 2:
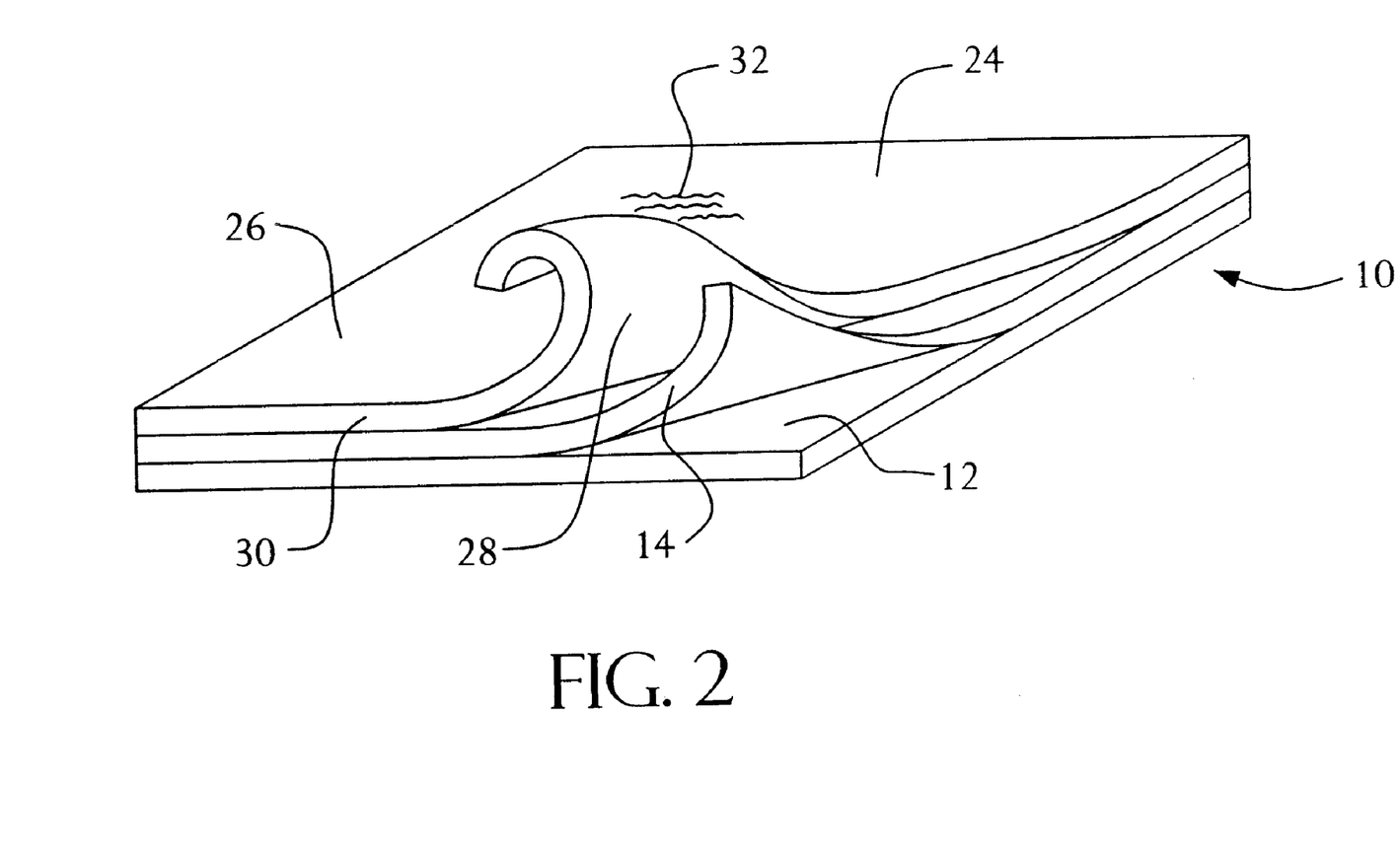
FIG. 2 illustrates an isometric view of an alternative embodiment of the magnetizable areas printed on the substrate as contemplated by the present invention.

Turning now to FIG. 2, an alternative embodiment of the magnetized area 14 applied to the substrate 10 is shown. As previously described in the context of FIG. 1, the magnetizable area 14 is applied to a portion of the substrate 10. In FIG. 2, the corner of the magnetizable area 14 is shown peeled back in order to show the location of the magnetizable area 14 on the substrate 10. A layer of material 24 can be used to overly the magnetizable area 14. The layer of material 24 includes an outer surface 26, an inner surface 28 and an edge 30. The outer surface 26 is visible to the observer, while the inner surface 28 is positioned to overlie the magnetizable area 14. The layer of material 24 should be thin enough so that the magnetic properties of the magnetizable area 14 (such as the ability to attract magnetic objects) can be sensed on the outer surface 26 through layer 24.

As an alternative embodiment, the outer surface 26 can include graphic indicia 32 thematically related to the book or to the magnetizable areas 14 provided underneath. In order to protect the graphic indicia 32, a transparent or clear sheet of material (not shown) can be laminated to the outer surface 26 of the layer of material 24, thus creating a magnetizable laminate.

Once the magnetizable areas 14 are printed on the substrate 10, the magnetizable particles can be permanently magnetized. Each of the magnetizable areas 14 or a portion thereof can be separately or "spot" magnetized, using processes such as electronic coils by means of which electric current is passed over or brought into contact with specific areas of the magnetizable areas 14 to induce magnetization. Of course, other techniques or means in which to induce magnetization can also be used. Since the magnetizable areas 14 are in the form of detailed designs and graphic images, any portion of the magnetizable areas 14 can be magnetized.

Hence, spot magnetization can be used to control the domain of a particular magnetized area 14. For instance, discrete portions of the road 18 or the house 20 can be magnetized, while the tree 22 may not. Moreover, each of the magnetizable areas 14 can be magnetized to orient the domain or direction of polarization in the same or a different direction. In use, the domain orientation can be any direction within 360°. The advantage of using detailed designs and graphic images is that all or discrete portions of the magnetizable area 14 can be permanently magnetized in any direction. This feature is important particularly when the substrate 10 is used in the context of instructional or educational devices or books, as explained below.

Figure 3:
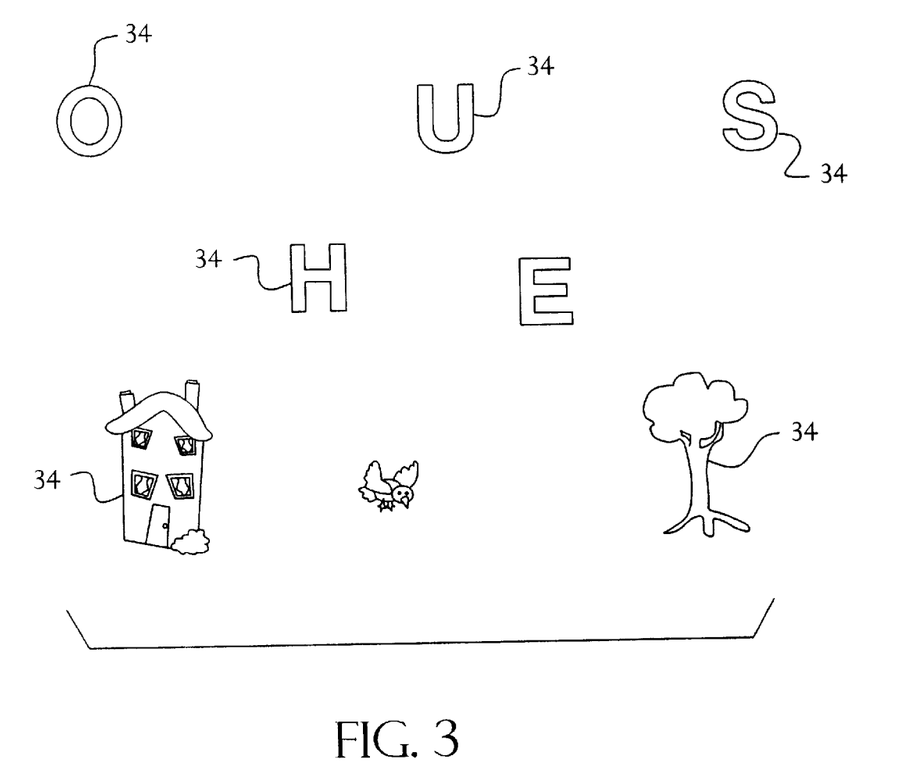
FIG. 3 illustrates a plurality of removable play pieces adapted to be magnetically attracted to the magnetizable areas on the substrate.

Turning now to FIG. 3, a plurality of removable interactive items or play pieces 34 are shown. The removable play piece 34 includes any item, device, object, apparatus, product, component, or article of manufacture that is adapted to interact with the magnetizable areas 14 as described herein. The removable play pieces 34 may be used in the context of a book, as presently preferred, or may be used as part of any activity engaged in for education or amusement. Preferably, the removable play pieces 34 will correspond to and are adapted to interact with the magnetizable areas 14 applied to the substrate 10 as shown in FIG. 1. The removable play pieces 34 shown in FIG. 3 include a house, a bird, a tree, and the letters "H", "O", "U", "S" and "E". Other items could also be used.

Figure 4:
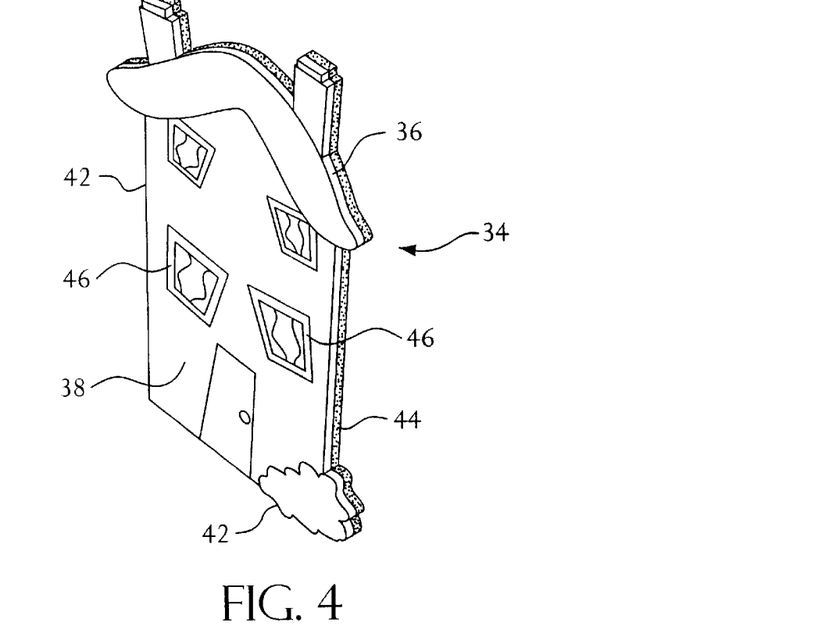
FIG. 4 is a front perspective view of one of the play pieces shown in FIG. 3.
Figure 5:
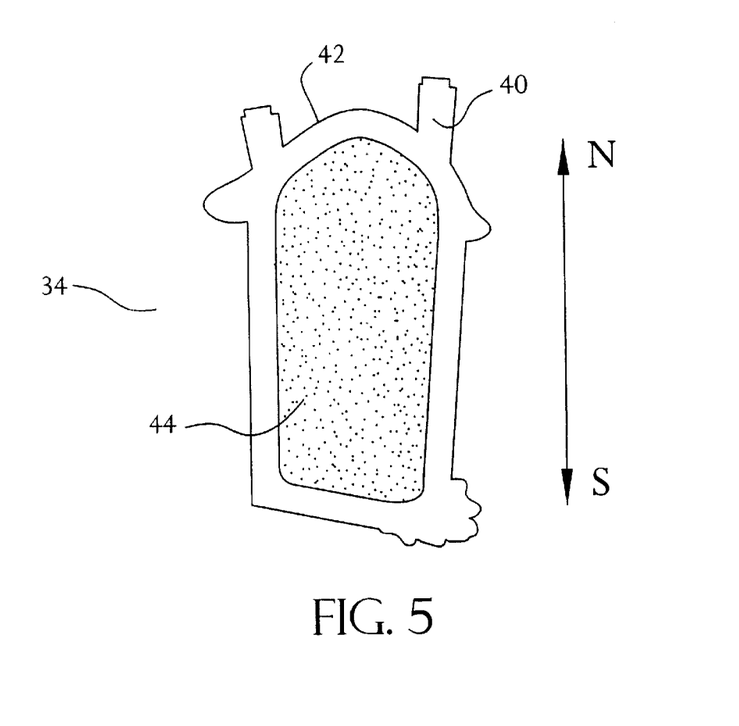
FIG. 5 is a rear view of the play piece shown in FIG. 4.

Referring now to FIGS. 4 and 5, an example of one of the removable play pieces 34 is shown. The removable play piece 34 (which is a depiction of a house) includes a substrate or support member 36, a front surface 38, a rear surface 40 and a circumferential edge 42. Preferably, the substrate 36 is a layer of material, such as paper or plastic, cut into the shape of a house. The house is sized and shaped to correspond directly with the shape of the house 20 formed by the magnetizable area 14 that appears on the substrate 10. Accordingly, the removable play piece 34 can be positioned over the magnetized area 14 of the house 20 shown in FIG. 1.

The front surface 38 may include graphic indicia 46 as shown in FIG. 4. The graphic indicia 46 may be thematically related to the book, the magnetizable areas 14 printed on the substrate 10, or may be any type of illustration, color or pictorial design. To enhance the appearance of the removable play piece 34 shown in FIG. 4, the graphic indicia 46 include windows, a door, and a bush. Therefore, the graphic indicia 46 contribute toward the interactive characteristics of the removable play piece 34. Of course, the graphic indicia 46 may be eliminated or replaced with other display items or surface treatments.

Magnetic material 44 may be applied to the rear surface 40 of the removable play piece 34. The purpose of the magnetic material 44 is to provide a substance for interacting with the magnetizable areas 14 printed on the substrate 10 by magnetic attraction. In that way, the magnetic material 44 allows each of the removable play pieces 34 to be placed or positioned on the substrate 10 or the magnetizable areas 14.

The magnetic material 44 can be in the form of flexible magnetic material, or even a rigid magnet. In the preferred embodiment, the magnetic material 44 is the magnetic ink used to make the magnetizable areas 14 that appear on the substrate 10. As shown in FIG. 4, the magnetic material 44 may be applied to cover the entire surface, or only a portion thereof, as shown in FIG. 5. In the event that magnetic ink is used, the play piece 34 can be permanently magnetized using electronic coils or other devices, as already described. As shown in FIG. 5, the magnetic ink applied to the rear surface 40 can have a specific direction of polarization. Those of ordinary skill in the art will appreciate that if the magnetizable areas 14 are magnetized, then the removable play pieces 34 can be made with non-magnetized material, and visa-versa.

Figure 6:
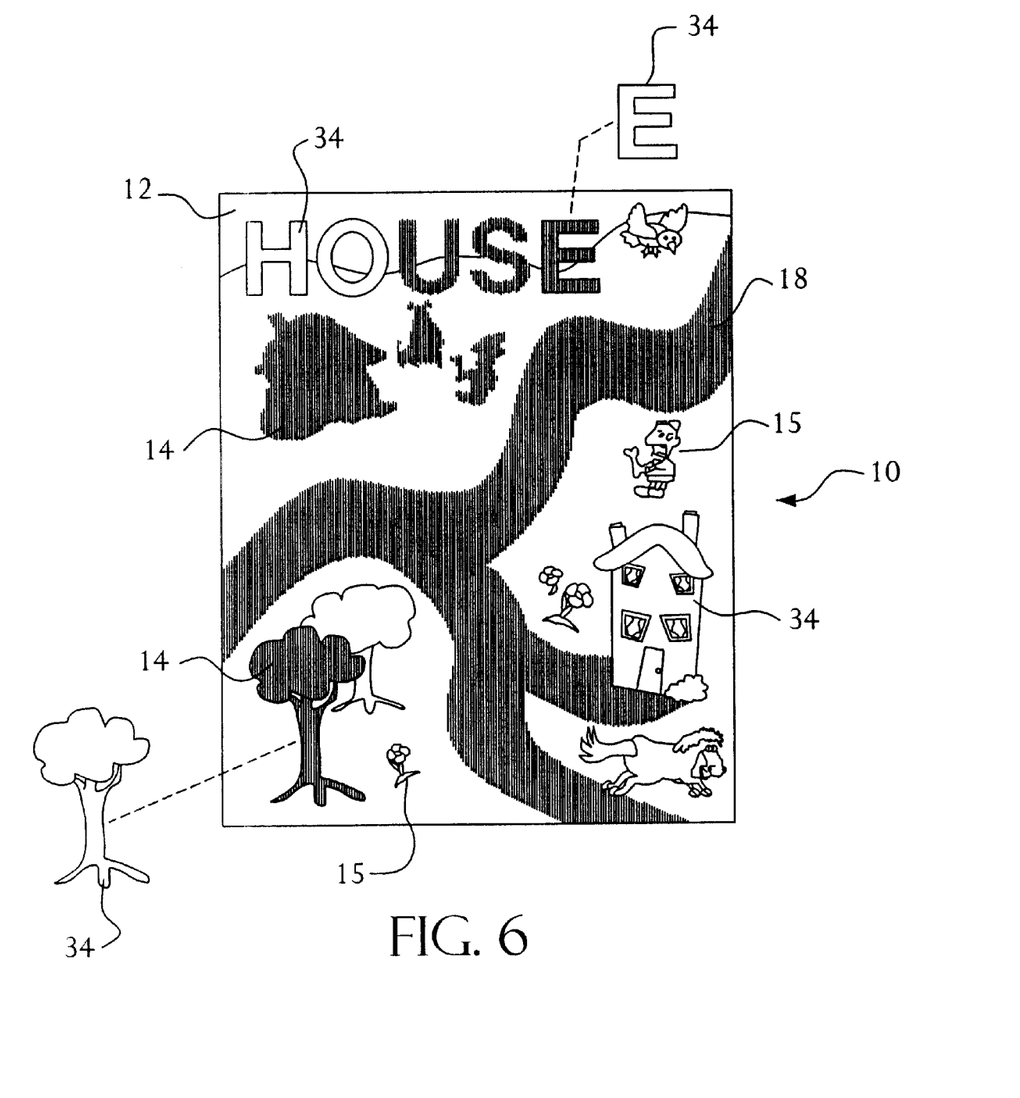
FIG. 6 illustrates the play pieces shown in FIG. 3 applied to the substrate having the magnetizable areas printed thereon.

As best seen in FIG. 6, the removable play pieces 34 can be positioned on the substrate 10 over the corresponding magnetizable areas 14. Accordingly, for example, children can learn to spell the word "house" by placing the letters "H" "O" "U" "S" and "E" on the appropriate area on the substrate 10. Children can also learn the location of a house or where a tree is in location relation to a road. The magnetic attraction between the magnetizable areas 14 and the removable play pieces 34 will insure that the removable play piece 34 will not fall off once it is placed on the corresponding magnetizable area 14.

Figure 7:
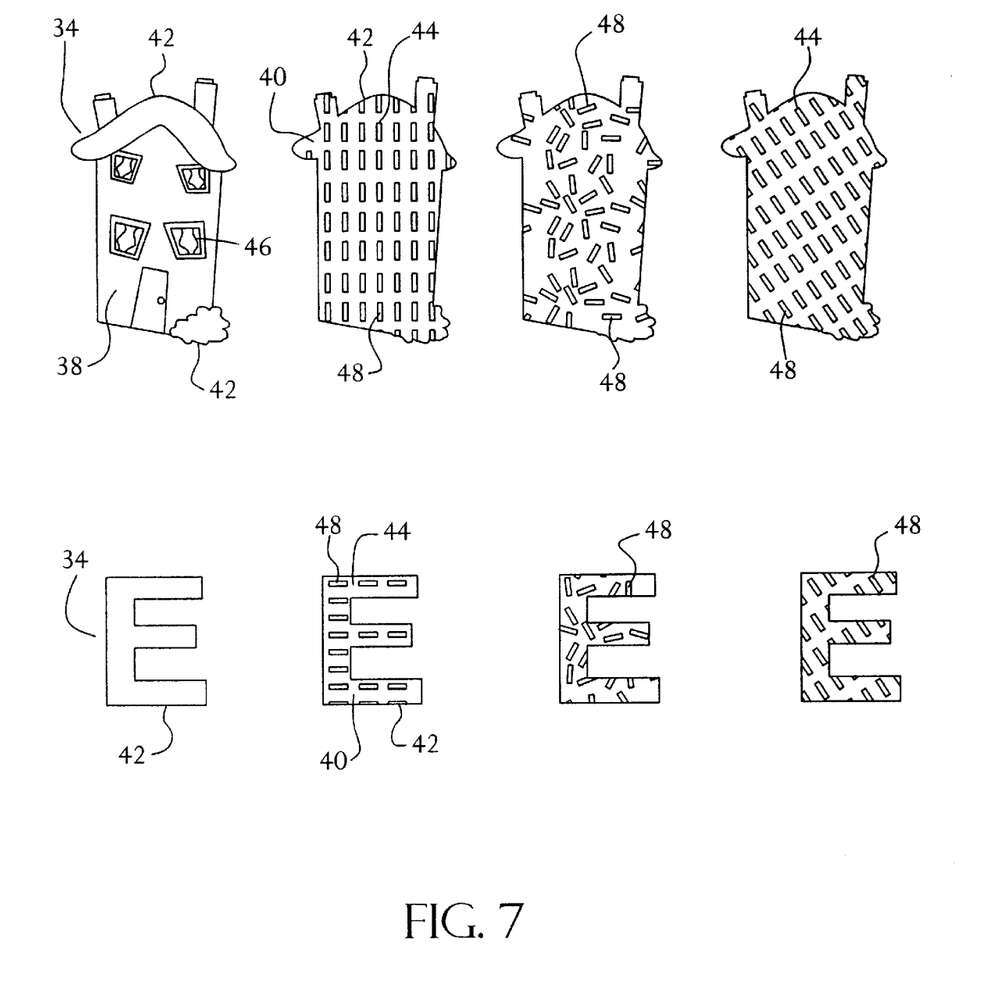
FIG. 7 illustrates alternative embodiments of two play pieces shown in FIG. 3, as contemplated by the present invention.

Referring now to FIG. 7, an alternative embodiment for the removable play pieces 34 (i.e., the house and the letter "E") is shown. The removable play pieces 34 are shown having the magnetic ink used to make the magnetizable areas 14 applied to the rear surface 40. The dashes or squares 48 are shown to illustrate the magnetizable particles suspended in the carrier for the ink. As shown, FIG. 7 illustrates how the domain of the magnetized magnetic ink can be controlled using the magnetization techniques discussed above.

Figure 8:
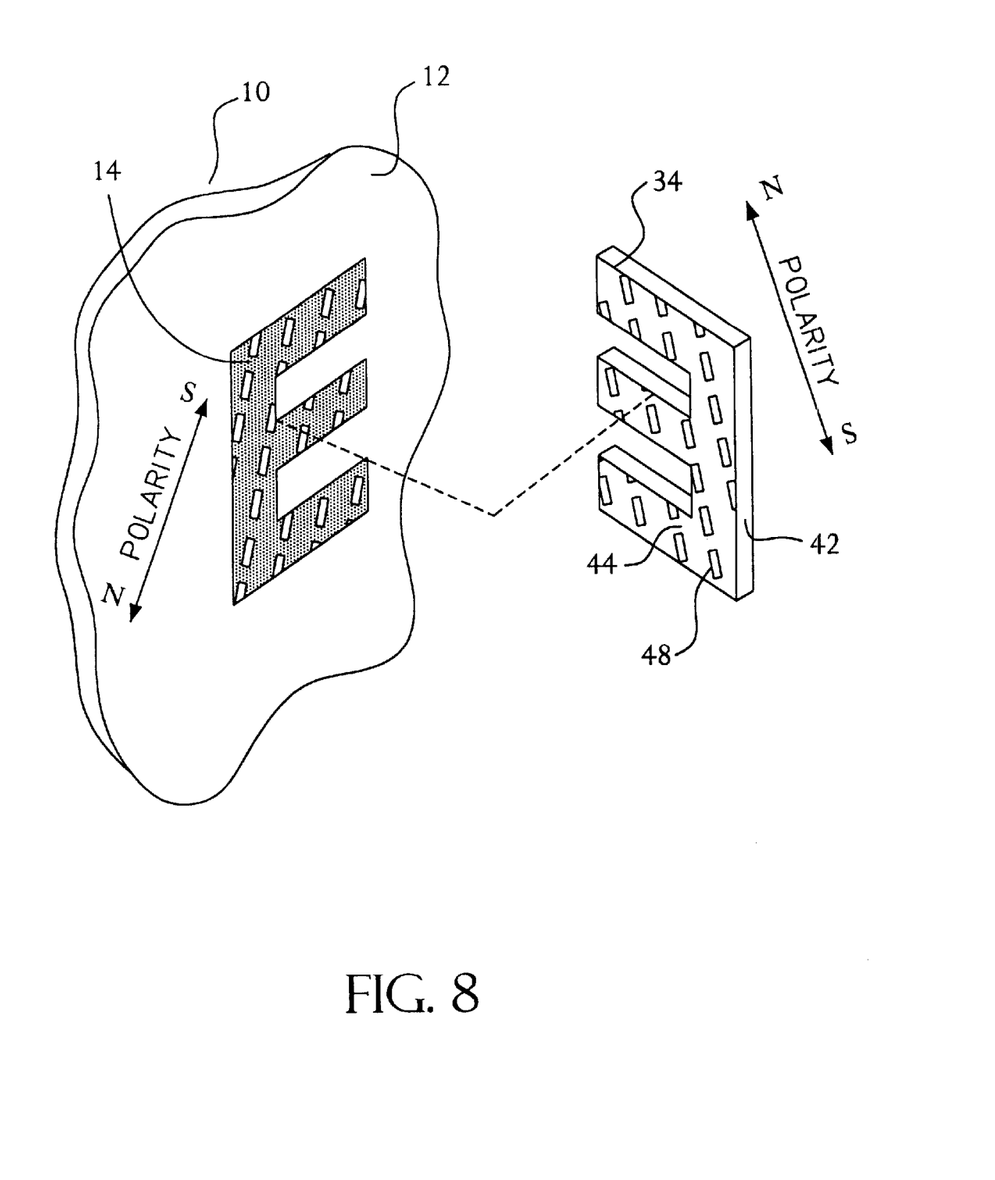
FIG. 8 shows one of the play pieces shown in FIG. 7 in relation to a portion of the magnetizable area printed on the substrate.

As shown, the direction of polarization can be in any direction that is desired. Controlling the direction of polarization is a particularly useful advantage of the present invention. For instance, the substrate 10 can be used as an instructional or educational medium in which children can learn words, phrases and the like. As an example of one embodiment, the removable playing piece 34 shaped in the form of an "E" can include magnetic material 44 having a predetermined direction of polarization, as shown in FIG. 7. As shown in FIG. 8, the play piece 34 can be manipulated or turned in relation to the magnetizable area 14 in the form of an E on the substrate 10. Moreover, each of the removable play pieces 34 and the corresponding magnetizable area 14 can have a direction of polarization that is opposite to the other. Thus, as depicted in FIG. 8, the direction of the polarization can be oriented such that the "E" can be applied to the magnetizable area 14 in only one direction. If, for example, the direction of the polarization of the removable play piece 34 and the magnetizable area 14 are the same, the magnetic properties will repel and prevent the removable play piece 34 from being placed on the magnetizable area 14 improperly.

Accordingly, as used in the context of a book, individual sheets of a book having a substrate 10 on which magnetizable areas 14 are printed can be used to teach children or a reader how to spell words, identify images, and the like. An advantage of the present invention is that a broad range of separately magnetizable complex images can be created on the substrate 10 using the techniques described in this invention. Thus, the invention permits a paragraph to be printed on the substrate 10, in which portions of sentences, words, or individual letters can be separately magnetized in order to teach children certain words, phrases or letters. Accordingly, by using magnetic ink specifically adapted for a preselected printing process, the location of magnetization can be controlled.

Figure 9:
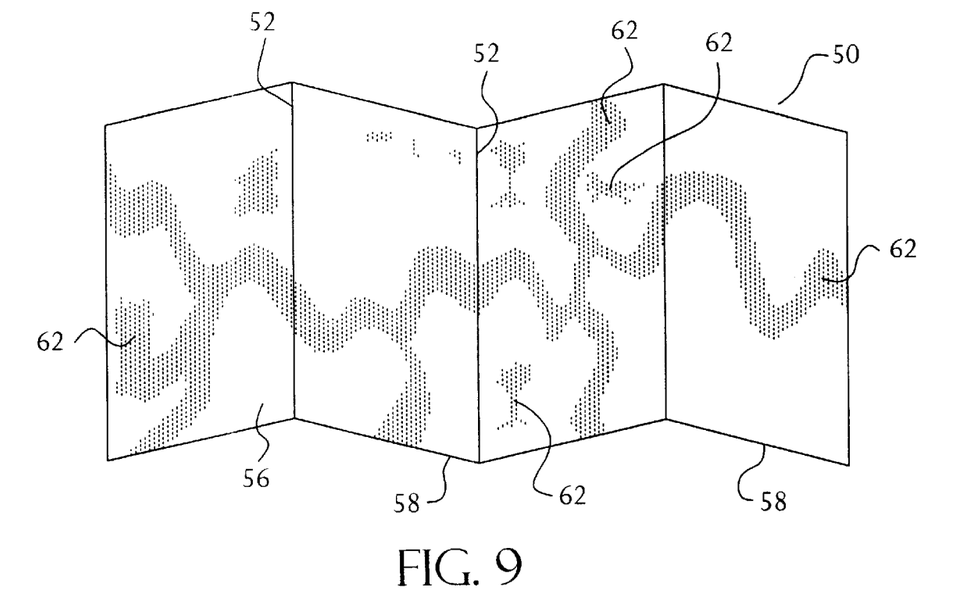
FIG. 9 is a rear view of an alternative embodiment of the substrate shown in FIG. 1.
Figure 10:
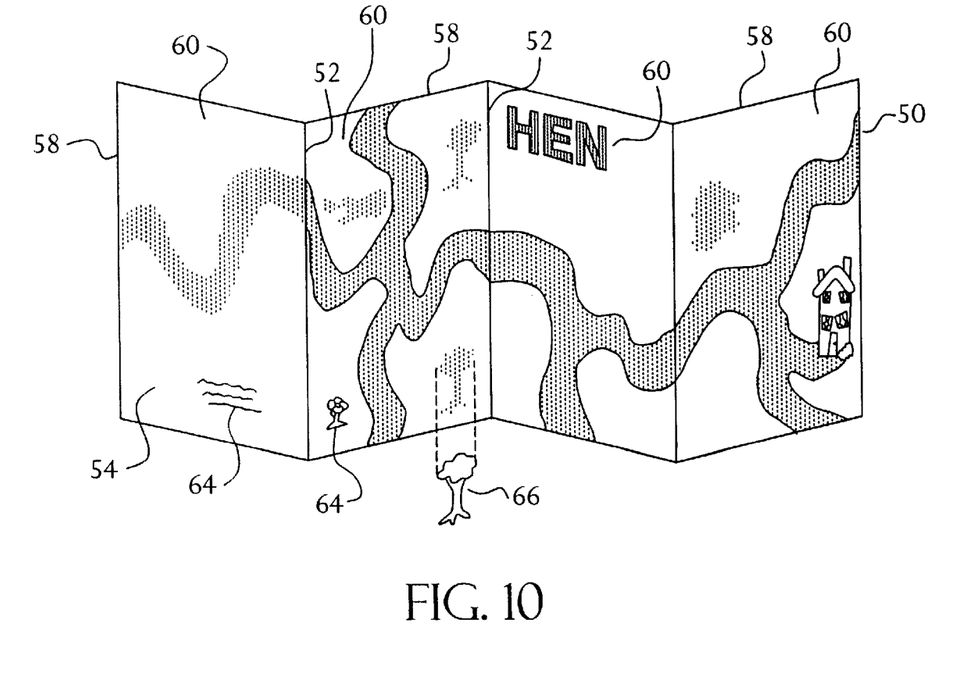
FIG. 10 is a front view of the substrate shown in FIG. 9.

Turning to FIGS. 9 and 10, an alternative embodiment of the present invention is illustrated. As shown in FIG. 9, a substrate 50, such as panels or sheets for a book, may include a plurality of fold lines 52. The substrate 50 includes an outer surface 54 (as seen in FIG. 10), an inner surface 56 and an edge 58. The fold lines 52 partition the substrate 50 into a plurality of individual layers or leaves 60 so that the substrate 50 can be concertina folded. Each of the layer 60 will have an outer surface, an inner surface and an edge that corresponds directly with the outer surface 54, inner surface 56 and edge of the substrate 50.

As illustrated in FIG. 9, magnetizable areas 62 are applied to the inner surface 56 of the substrate 50. The magnetizable areas 62 are applied in the same manner as discussed with respect to FIG. 1, but will be non-visible to an observer. Any type of printing process can be used and any shape of magnetizable areas 62 can be formed. Preferably, the magnetizable areas 62 are only printed on those areas of the inner surface 56 so desired. However since the magnetizable areas 62 will not be directly seen, the type of detail that is otherwise necessary may not be needed. Also, a thicker magnetic ink or larger magnetizable particles can be used to create the magnetizable areas 62. Using larger magnetizable particles will allow the magnetic properties of the magnetizable areas 62 to be sensed on the outer surface 54, with only a slight (if any) loss of sensitivity.

As shown in FIG. 10, the front surface 54 is overprinted with graphic indicia 64 corresponding directly to the magnetizable areas 62 printed on the inner surface 56. The light shading is used in the drawings for the sole purpose of illustrating the location of the magnetizable areas 62 and thus the invisible properties of magnetism. The graphic indicia 64 can include trees, a house, a road and the like to further enhance the appearance of the outer surface 54. Any type of color combination or other surface treatments can be used.

The magnetizable areas 62 are adapted to be used with a plurality of removable play pieces 66, as discussed with reference to FIG. 6 and 5. The removable play pieces 66 will include magnetic material, such as a flexible or rigid magnet, or the magnetic ink used to create the magnetizable areas 62. Each of the removable play pieces 66 are shaped and sized to correspond to at least one of the magnetizable areas 62 applied to the inner surface 56.

Figure 11:
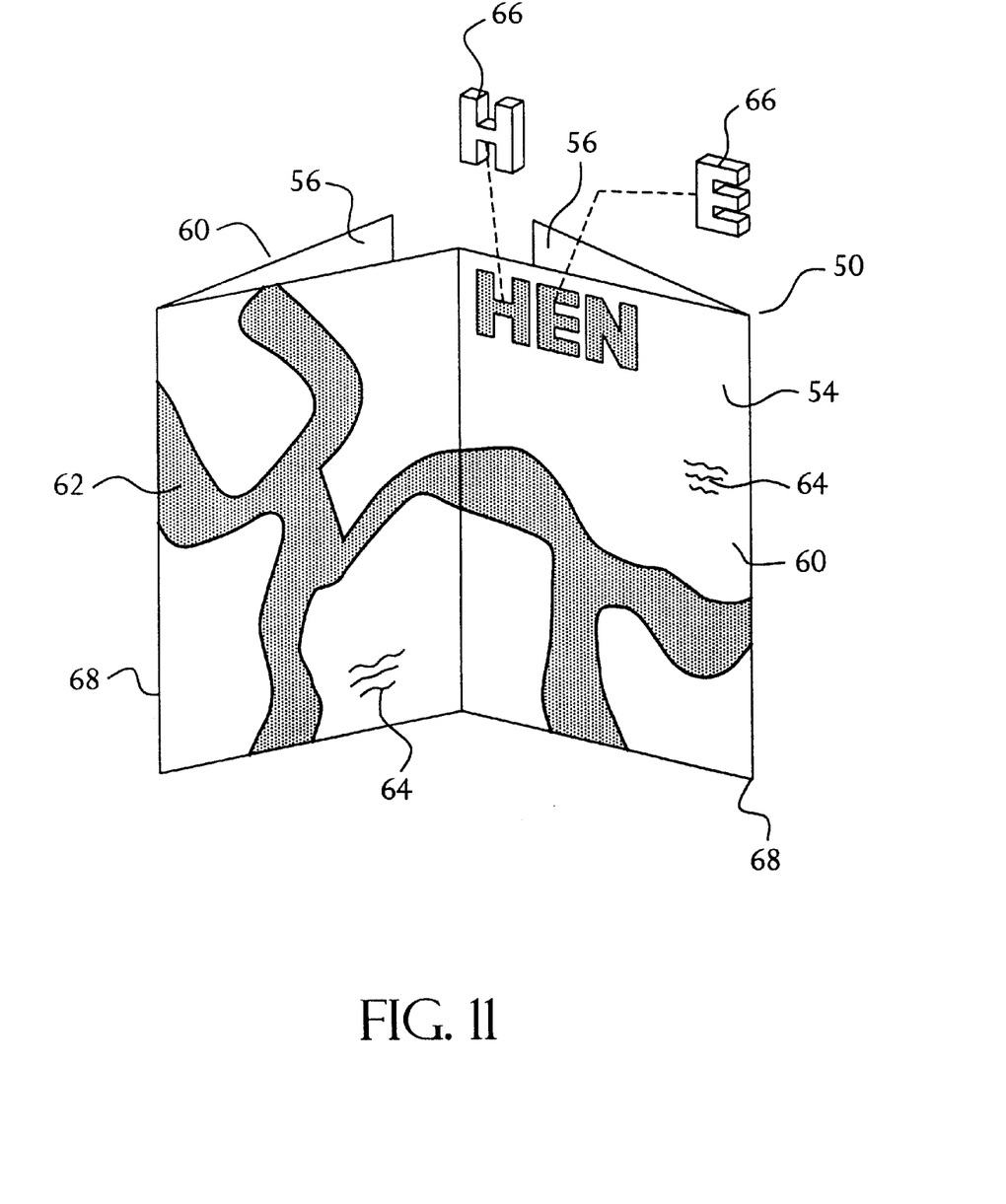
FIG. 11 is a perspective view of the substrate shown in FIG. 9, shown folded into a sheet for the book.

As shown in FIG. 11, the substrate 50 can be concertina folded about the fold lines 52 to form individual leaves or sheets 68 for the book. The leaves 68 are formed by folding the substrate 50 so that the inner surface 56 of one layer 60 will overlie the inner surface of the adjacent layer 60. By folding the substrate 50 in this manner, the magnetizable areas 62 are completely sealed within the inner surface 56 of the layers 60 and are thus concealed from sight. Thus, only the graphic indicia 64 applied to the outer surface 54 will be visible. Of course, other folded designs can be used. The substrate 50 can be folded into one leaf or multiple leaves, depending upon the particular application. However, the design shown in FIG. 11 is presently preferred.

Figure 12:
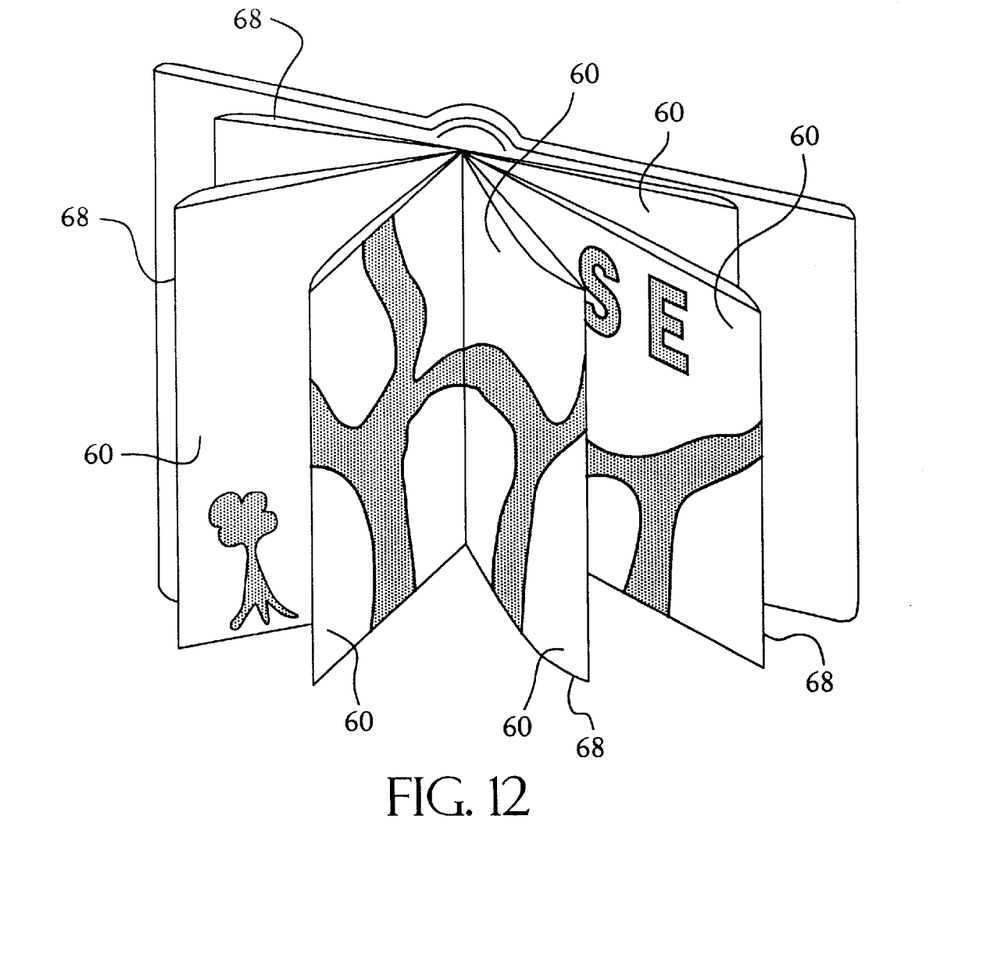
FIG. 12 illustrates a plurality of sheets shown in FIG. 9, mounted to the book.

Once the leaves 68 are formed, they can be bound in a volume to form a book. As shown in FIG. 12, each of the leaves 68 forms a separate sheet for the book. As a result, an interactive or educational book can be formed having individual leaves 68 that incorporate the invisible properties of magnetism. For example, each leaf 68 can be used to teach a reader a different skill, words or images using the removable play pieces 66.

Figure 13:
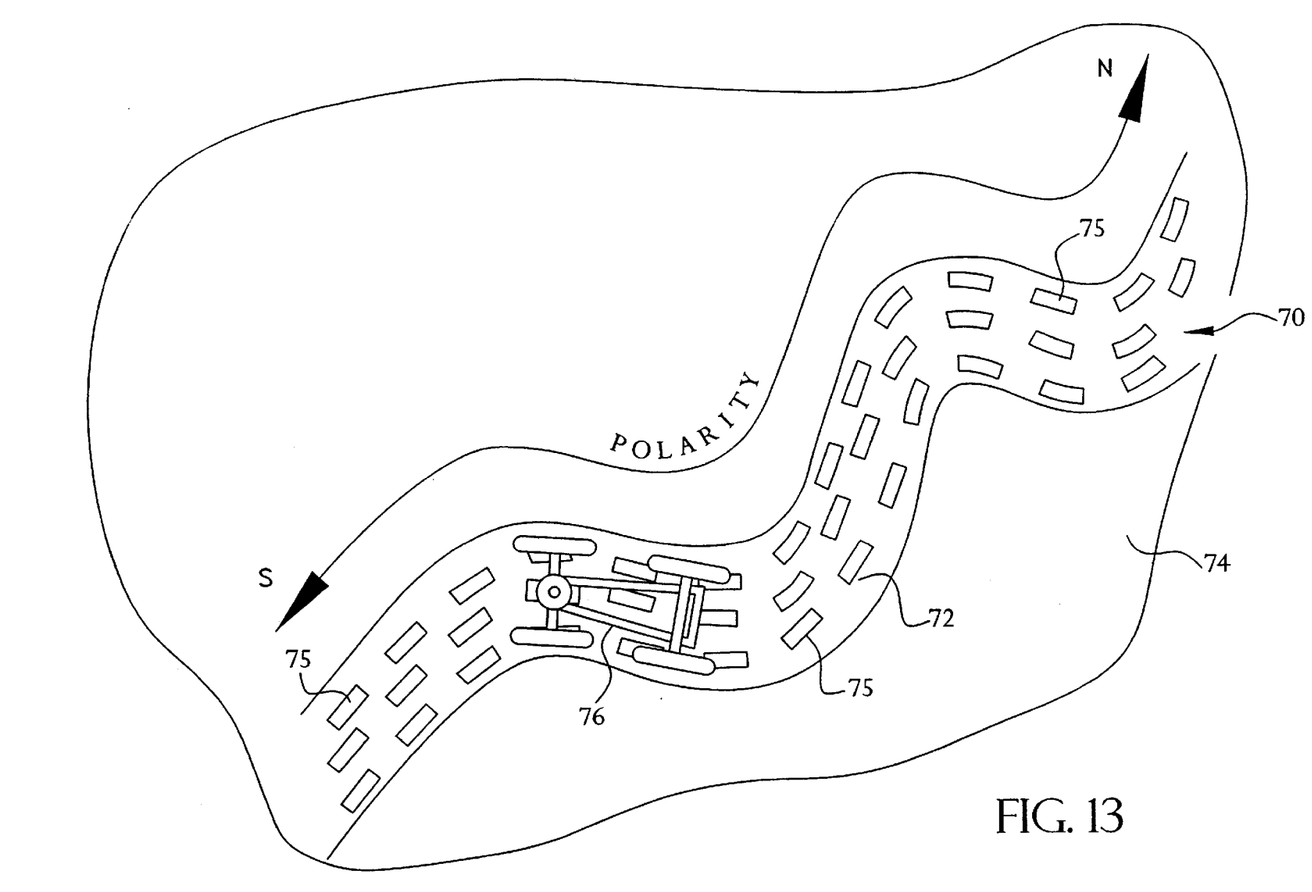
FIG. 13 is a top plan view of a portion of an alternative embodiment of the magnetizable areas printed on the substrate with an alternative embodiment of a removable play piece as contemplated by the invention.

Turning to FIG. 13, a portion of a road 70 similar to the road 18 shown in the previous drawings is shown. The road 70 is formed by the magnetizable area 72 applied to either the outer or inner surface of a substrate 74, which forms part of a sheet for book. The dashes or boxes 75 are provided for the sole purpose of illustrating the orientation of the magnetizable particles suspended in the magnetic ink. The magnetizable area 72 used to form the road on the substrate 74, is done so using ink and a preselected printing process in the same manner as previously described. As shown in FIG. 13, the magnetizable area 72 is magnetized to have a predetermined direction of polarity as indicated by the "N-S" directional arrow.

Figure 14A:
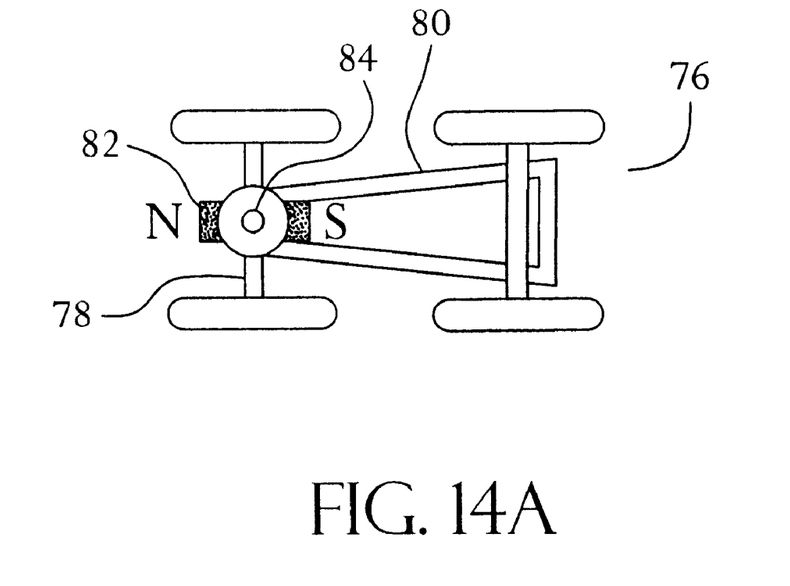
FIGS. 14A and 14B are top plan views of the interactive item shown in FIG. 13.

A removable play piece or interactive item 76 is positioned on the road 70. The removable play piece 76 may be in the form of a car or other movable vehicle. As best shown in FIG. 14A, the car includes a base 78 and a directional member 80. The base 78 includes a magnet 82 having a predetermined direction of polarization. The magnet 82 is mounted on an axle attached to front wheels. The directional member 80 is pivotably attached to the base 78 by a pivot pin 84. The directional member 80 includes an axle attached to a pair of wheels.

Figure 14B:
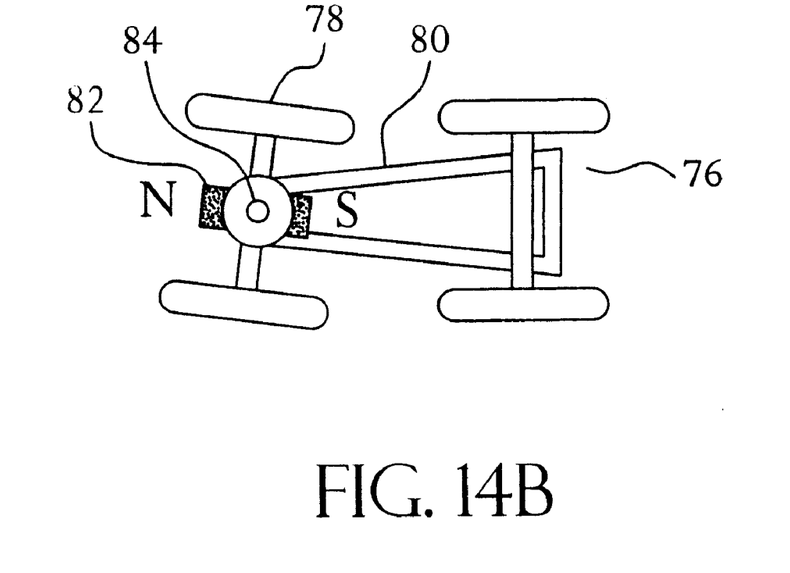

As best seen in FIG. 14B, the directional member 80 is adapted to rotate in either a clockwise or a counter-clockwise direction to indicate the particular direction of polarization of the road. In practice, the removable play piece 76 may be manually or mechanically moved along the road 70. Of course, by using the techniques described in the present invention, the outer edges of the road 70 can have a direction of polarization that is opposite to the direction of polarization of the main portion of the road. As a result, if the removable play piece 76 reaches the sides of the road 70, it will be repelled back into the main portion of the road. As a result, the car will remain within the road as moves along.

Likewise, magnetizable areas 72 having opposite directions of polarity can be applied to the areas surrounding the road. In this way, the tree may have a direction of polarization opposite to the removable play piece 76. As a result, the removable play piece 76 will be prevented from being placed on the tree. Furthermore, the removable play piece 76 may be equipped with a motor, gear, actuator, or other electronic or mechanical device to drive a plurality of rotatable wheels. Once the motor is turned on or actuated, the removable play piece 76 will move along the path according to the direction of the polarity. Other embodiments, applications and means for controlling the location of the removable play piece 76 can be used.

In an alternative embodiment, it is contemplated that the magnetizable areas 14 may be applied to the first surface 12 of the substrate 10 in the form of electrical traces as part of an electric circuit used to support interactive devices such as light emitting diodes, speakers, lights or other audio and visual type displays. It is also contemplated that electrical traces may be positioned on the fist surface 12 to include two or more contact points spaced away from, but in registry with each other. The circuit may be closed by the heat or moisture of a finger or by one of the play pieces to bridge the contact points. When the contact points are bridged, and the circuit closed, energy will flow through the circuit so that the interactive device is energized.

As an alternative embodiment, the present invention is flexible enough so the magnetizable areas may be applied or printed onto the substrate 10 in the form of readable segments or dots to produce code or an analog signal.

The present invention may be embodied in other specific forms without departing from the spirit or essential attributes thereof and, accordingly, reference should be made to he appended claims, rather than to the foregoing specification, as indicating the scope of the invention.

What is claimed is:

1. An interactive book, comprising:
    a substrate having a first surface, a second surface, and at least one edge,
    a preselected magnetizable area in the form of a road applied to the substrate with an ink having ferromagnetic particles shaped and sized to be compatible with a preselected printing process, and having a predetermined direction of polarization parallel to the surface of the substrate, and
    a play piece removably engageable with the ferromagnetic particles, the play piece including magnetized material having an opposite magnetic polarization for interacting with the preselected magnetizable area printed on the substrate by magnetic attraction.

2. The interactive book as claimed in claim 1, wherein the removable play piece is motorized and adapted to move along the road.

3. A book adapted for teaching or entertainment comprising:
    a substrate having a first surface, a second surface and oppositely disposed side edge,
    preselected magnetizable portions applied to the substrate, the magnetizable portions being formed by a printable ink having selectively magnetizable particles chosen to be compatible with a preselected printing process to apply the ink to the substrate,
    graphic indicia applied to the substrate, the graphic indicia including pictorial designs and shapes related to the magnetizable portions formed on the substrate, and
    a plurality of play pieces adapted for magnetically removable attachment to the preselected magnetizable portions of the substrate, each of the removable play pieces having a portion to which magnetized material is applied,
    wherein the magnetizable portions are permanently magnetized with a polarity parallel to the surface of the substrate, and the removable play pieces are permanently magnetized with an opposite polarity so that the removable play pieces can be positioned on the substrate in only one manner.

4. The book as claimed in claim 3, wherein the substrate is folded about a fold line in order to form a leaf for the book, the leaf having outer and inner surfaces after folding, such that the magnetizable portions are located on the inner surface.

5. The book as claimed in claim 4, wherein the magnetizable portions are selectively magnetized to attract and hold the removable play pieces.

6. The book as claimed in claim 3, wherein the graphic images are printed on both the front surface and the rear surface of the substrate.

* * * * *